United States Patent

[11] 3,578,346

| [72] | Inventor | Jerry G. Jelinek |
| | | Whittier, Calif. |
| [21] | Appl. No. | 794,935 |
| [22] | Filed | Jan. 29, 1969 |
| [45] | Patented | May 11, 1971 |
| [73] | Assignee | Parker-Hannifin Corporation |
| | | Cleveland, Ohio |

[54] SEALED JOINT AND GASKET THEREFOR
21 Claims, 5 Drawing Figs.

| [52] | U.S. Cl. | 277/180, |
| | | 277/211, 277/235 |
| [51] | Int. Cl. | F16j 15/08, |
| | | F16j 15/10 |
| [50] | Field of Search | 277/180, |
| | | 235, 211, 166 |

[56] References Cited
UNITED STATES PATENTS

| 2,191,044 | 2/1940 | Seligman | 277/235X |
| 3,076,551 | 2/1963 | Humbert, Jr. | 277/166X |
| 3,448,980 | 6/1969 | Jelinek et al. | 277/180 |

*Primary Examiner*—Samuel B. Rothberg
*Attorney*—John N. Wolfram

ABSTRACT: A joint and a gasket therefor in which the gasket comprises a resilient member attached to an offset portion of a first rigid plate. A second rigid plate is adjacent the first plate and surrounds the resilient member but is unattached to either so that it may be reused with a new first plate and elastometric member if the latter becomes worn out or damaged.

Patented May 11, 1971

3,578,346

INVENTOR:
JERRY G. JELINEK
John N. Wolfram
ATTORNEY

3,578,346

SEALED JOINT AND GASKET THEREFOR

BACKGROUND OF THE INVENTION

When sealing joints between fluid carrying members it is desirable that the jointing surfaces be flat for simplifying manufacture. It is also frequently desirable that a gasket be used for sealing the joint that comprises or includes a resilient sealing member that responds to pressure of the fluid to increase the sealing pressure against the jointing surfaces and that the takeup of the joint be limited by positive engagement of rigid members to avoid detrimental crushing of the resilient member.

To accomplish these objects previous gaskets and joints have resorted to combinations of metal and elastomeric parts that have been expensive to manufacture and replace or repair after service. High cost in this respect is particularly true if the gasket is of special or nonstandard configuration to seal irregularly shaped or plural fluid passages.

For example, U.S. Pat. No. 2,717,793 shows a gasket comprising a thick metal plate having grooves machined therein into which elastomeric packing material is molded by a method that provides precisely the correct volume of elastomer regardless of tolerence variations in the grooves. If the elastomer wears out or is damaged it is too costly in many instances to salvage the metal part by removing the original elastomer and remolding with new. Also, it is impractical to mold a separate elastomeric seal and cement it into the groove because of tolerance variations from part to part,.

U.S. Pat. No. 3,342,501 shows a gasket in which three metal plates are welded together and have an elastomeric seal molded to the plates. Again, if the elastomer wears out or is damaged, it is too expensive or impractical to salvage the metal parts by stripping the elastomer therefrom and attempting to replace it with either molded in place or premolded elastomer.

SUMMARY OF THE INVENTION

This invention provides a combination metal and resilient member gasket for sealing between flat surfaces wherein the gasket comprises a main rigid plate removably mounted relative to a resilient member and an inexpensive rigid plate to which the resilient member is attached. If the resilient member becomes worn or damaged it and the attached inexpensive plate can be discarded and a new set used with the original main plate. The inexpensive plate is preferably of thin flat sheet with an offset portion to which the resilient member is molded. The main plate is thick and has an opening that receives the resilient member and the offset portion of the thin plate and is removably mounted relative to the thin plate and the resilient member so that it can be readily assembled or disassembled therefrom.

DESCRIPTION

Figure 1:
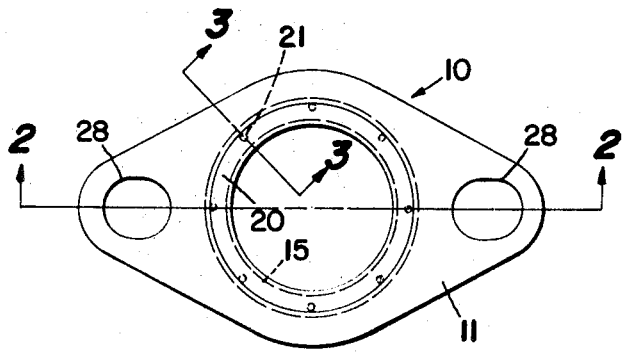
FIG. 1 is a plan view of one form of the gasket.
Figure 2:
FIG. 2 is a cross section along the lines 2-2 of FIG. 1.

The gasket 10 in the form illustrated has a first plate 11 of rigid material such as metal or hard plastic that is thin, flat and of uniform thickness and that has an offset portion formed thereon that comprises an axially extending cylindrical portion 13 and a laterally extending flange 14 having an opening 15 therethrough. Molded to the offset portion is a resilient member 20 of synthetic rubber, silicone, or other elastomeric material. Transverse flange 14 has a series of small openings 21 therethrough that receive some of the resilient material for anchoring or attaching the resilient member 20 to plate 11.

The gasket also includes a second or main plate 25 of rigid material such as metal or hard plastic and flat on both sides. It has the same external configuration as plate 11 but has an opening 26 therethrough to receive and closely fit the outer diameter of cylindrical portion 13 of the first plate and a portion of resilient member 20 and closely fits the same. Plate 25 is preferably not attached to either plate 11 or resilient member 20 but it may have a light press fit with either so as to facilitate handling the complete gasket as a unit and yet be readily removable from the assembly. In other aspects of the invention plate 25 may be more firmly attached to either plate 11 or gasket 20, or both.

Figure 3:
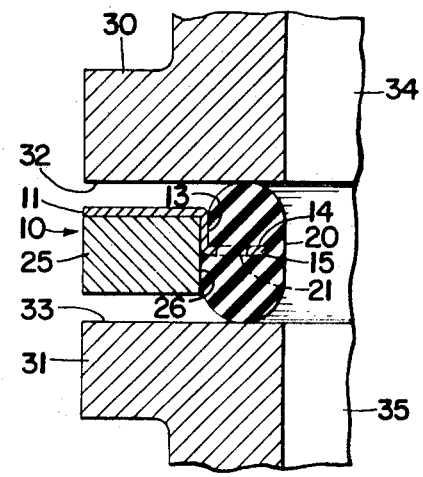
FIG. 3 is a fragmentary enlarged section view along the lines 3-3 of FIG. 1 but showing the gasket in initial untightened position between a pair of pipe flanges.
Figure 4:
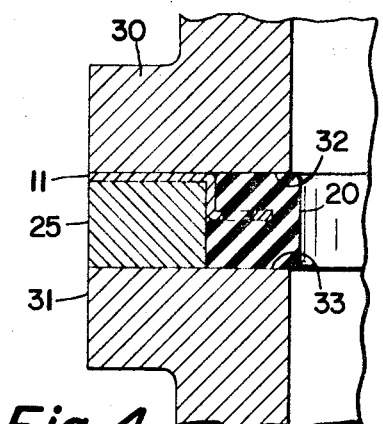
FIG. 4 is a view similar to FIG. 3 but showing the joint in tightened condition.

In making up a joint with a pair of pipe flanges 30, 31 having jointing surfaces 32, 33 and fluid flow passages 34, 35, the gasket initially assumes the position shown in FIG. 3 in which resilient member 20 engages surfaces 32, 33 while the upper face of plate 11 and the lower face of plate 25 are out of contact with such surfaces. As flanges 30, 31 are brought together by volts passing through holes 28, resilient member 20 deforms into tight sealing contact with surfaces 32, 33 and the latter respectively engage the upper face of plate 11 and the lower face of plate 25 to limit further deformation of the resilient member as shown in FIG. 4. Now, when fluid under pressure is introduced into passages 34, 35 it exerts radially outward pressure on resilient member 20 tending to deform the latter into still tighter engagement with surfaces 32, 33. At the time, plates 11 and 25 support the outer periphery of the resilient member to prevent radially outward extrusion thereof. Moreover, plate 25 supports cylindrical portion 13 of plate 11 to prevent significant radially outward deformation thereof.

Figure 6:
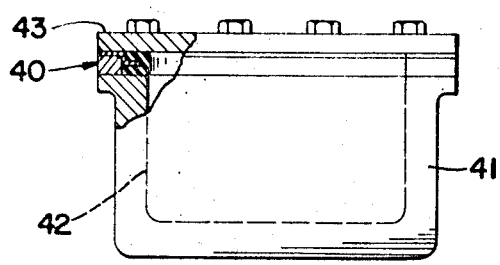
FIG. 6 is a view partly in section showing the gasket as applied to a contained.

In the assembly shown in FIG. 6, a gasket 40 constructed in the same manner as gasket 10 but of different external configuration is interposed between a container 41 having a fluid receiving chamber 42 and a cover 43.

Figure 5:
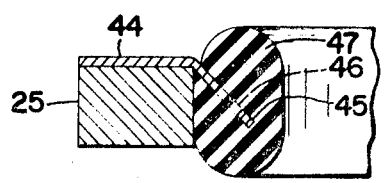
FIG. 5 is a fragmentary section view of a modified form of the gasket.

In a modified form of the gasket, as shown in FIG. 5, a different thin plate 44 is substituted for the plate 11 of FIGS. 1 to 4 and the offset portion comprises a tapered or inclined portion 45 that has perforations 46 therethrough for anchoring the resilient member 47.

I claim:

1. A gasket for positioning between two parts to be sealed by said gasket, said gasket comprising a member of resilient material, a first plate having a first portion projecting radially from the member and having a second portion axially offset from the first portion, the member being attached to the offset portion, and a second plate adjacent the first plate and radially opposite said second portion, said second plate being independent of said parts.

2. The gasket of claim 1 in which the second plate is removably mounted relative to the first plate and member.

3. The gasket of claim 1 in which the offset portion and the member have aligned axial surfaces and said second plate has an axial surface closely fitting said aligned surfaces.

4. A gasket for positioning between two parts to be sealed by said gasket, said gasket comprising a member of resilient material, a first plate having an opening therethrough, said resilient member attached to the first plate at said opening, a second plate removably mounted adjacent the first plate and surrounding said resilient member, said second plate being independent of said parts.

5. The gasket of claim 4 in which the first plate has an axially offset portion surrounding said opening and said resilient member is attached to said offset portion.

6. The gasket of claim 4 in which said second plate is thicker than said first plate.

7. The gasket of claim 5 in which said offset portion is inclined relative to said first portion.

8. The gasket of claim 5 in which said second plate has an opening therethrough with an axially extending wall that closely fits about said axially offset portion.

9. The gasket of claim 4 in which said first plate has an axially extending portion terminating in a transversely extending flange in which said opening is formed, and the second plate is radially opposite said flange.

10. A gasket comprising a plate of rigid material having an opening therethrough, said plate having a generally flat planar outer peripheral portion and an inclined portion that surrounds said opening and merges directly with said outer peripheral portion, and an elastomeric member attached to said inclined portion and located immediately adjacent said flat planar outer peripheral portion, said elastomeric member extending beyond said peripheral portion a greater distance in one axial direction than in the other.

11. The gasket of claim 10 in which the inclined portion extends across the midpoint of the radial thickness of the elastomeric member.

12. A gasketed joint comprising a pair of members having opposed surfaces to be sealed, a gasket between said members, said gasket comprising a resilient member attached to a first plate, and a second plate adjacent the first plate and surrounding a portion of said gasket, said second plate being removably mounted relative to said first plate and resilient member, said resilient member and said plates being engaged by said surfaces.

13. The joint of claim 12 in which said surfaces are flat and planar and each of said plates is of uniform thickness.

14. The joint of claim 12 in which each of said plates is of uniform thickness and the second plate is thicker than the first.

15. A gasketed joint comprising a pair of members having opposed surfaces to be sealed, a gasket between said members, said gasket comprising a first plate having an offset portion, a resilient member attached to said offset portion, a second plate surrounding the offset portion, and said plates and said resilient member being in engagement with said surfaces.

16. The joint of claim 15 in which said second plate has an unbroken axial wall extending therethrough that is radially opposite said offset portion.

17. A gasket comprising a plate of rigid material attached to an elastomeric member, said plate including a flat planar portion and a generally axially extending portion that enters said elastomeric member near to one end of the same than to its other end, said axially extending portion being substantially completely embedded within said elastomeric member, and said elastomeric member being devoid of grooves in its exposed surface.

18. The gasket of claim 17 in which said axially extending portion is frustoconical throughout its length.

19. The gasket of claim 17 in which said elastomeric portion in its relaxed condition has a substantially straight and uninterrupted radially outer wall and curved end surfaces, said curved end surfaces extending axially beyond said outer wall substantially equal distances, and said axially extending portion entering said elastomeric member between one end of said outer wall substantially equal distances, and said axially extending portion entering said elastomeric member between one end of said outer wall and the adjacent curved end surface.

20. A gasket comprising a member of resilient material, a first plate having an opening therethrough, said resilient member attached to the first plate at said opening, a second plate removably mounted adjacent the first plate and surrounding said resilient member, the second plate having an opening in which the resilient member is received with a light press fit therebetween that permits such removal.

21. A gasket comprising a member of resilient material, a first plate having an opening therethrough, said resilient member attached to the first plate at said opening, a second plate removably mounted adjacent the first plate and surrounding said resilient member, the resilient member extending axially beyond both plates.